Oct. 25, 1966 R. A. KOBLE 3,281,215

POLYMER RECOVERY TANK

Filed Feb. 10, 1966

INVENTOR
R. A. KOBLE
BY Young & Quigg
ATTORNEYS

United States Patent Office 3,281,215
Patented Oct. 25, 1966

3,281,215
POLYMER RECOVERY TANK
Robert A. Koble, Bartlesville, Okla., assignor to Phillips Petroleum Company, a corporation of Delaware
Filed Feb. 10, 1966, Ser. No. 526,530
2 Claims. (Cl. 23—285)

This is a continuation-in-part of my copending application Serial No. 227,141, filed October 1, 1962 and now abandoned.

This invention relates to method and means for removing normally solid olefin polymers from solution. More particularly, it relates to a method and means for precipitating the soft polymer from a solvent material by contacting the solution with water. Still more particularly, it relates to a method and means for precipitating normally solid polymers from a polymeric solution by contacting the polymer solution with water in such a manner as to avoid the necessity of having to strip the total volume of water used in precipitating the polymer. Further, it relates to a method and means for avoiding the introduction of excessive amounts of water into the stripping zone by providing a means for removing same subsequent to its contact with the polymer slurry but prior to introduction into the stripping zone.

It is known that 1-olefins having a maximum of 8 carbon atoms per molecule and no branching nearer the double bond than the 4-position can be polymerized to solid and semisolid polymers at low temperature and pressures as compared with conventional processes for polymerizing these olefins. Said polymerization is generally carried out by first admixing and at least partially dissolving the olefin in a non-polymerizable solvent and carrying out the polymerization in the presence of catalyst.

In the patent to Hogan et al., U.S. 2,825,721, issued March 4, 1958, a process is disclosed for producing novel polymers of 1-olefins by carrying out the polymerization at a temperature in the range of 100–500° F. in the presence of 0.1 to 10 or more weight percent of chromium oxide, including a substantial proportion of hexavalent chromium associated with at least one porous oxide selected from the group consisting of silica, alumina, zirconia, and thoria. A preferred catalyst is one comprising 0.1 to 10 weight percent chromium as chromium oxide on a silica-alumina support such as 90 percent silica-10 percent alumina. This catalyst is ordinarily a highly oxidized catalyst which has been activated by high-temperature treatment under non-reducing conditions and preferably in an oxidizing gas. Olefins other than 1-olefins as described or polymerized by the action of this catalyst with such polymers are often predominantly normally liquid at least when polymerized under the described conditions. The polymerization is suitably carried out in the liquid phase such as in solution in a hydrocarbon solvent, especially a paraffin naphthene which is liquid under the polymerization conditions; however, vapor phase operation or mixed phase operation can be effective. Also, diolefins can be polymerized by the chromium oxide catalyst to produce solid polymers. As has been indicated, this invention is applicable to the recovery of polymeric 1-olefins from solution and is particularly applicable to the recovery of polymer from a solvent as prepared by the above preferred method. However, such polymers as prepared by other catalyst systems can be recovered by the processes of this invention, e.g., those prepared by the organometallic catalysts disclosed by Belgian Patent 533,362, November 16, 1954, by Karl Ziegler.

These polymers of 1-olefins have been separated from hydrocarbon solvents by simple vacuum flashing, but this method produces a low bulk density and fibrous material. This material is difficult to handle and is unsuitable for certain uses. For example, when thin films are prepared from such material, it tends to result in an excessive quantity of "fish eyes." The film is not homogeneous and is therefore objectionable to the trade.

It has also been proposed that a hot hydrocarbon solution of polymeric 1-olefin having a concentration in the range of 1 weight percent polymer be dispersed in 1 to 5 volumes of cool water per volume of solution so as to obtain a temperature below the precipitation temperature of the polymer while maintaining sufficient pressure in the system to maintain the solvent and water in substantially the liquid phase. More preferably, the concentration of solvent and polymer is in the range of 2 to 5 weight percent. The important thing is to cause the polymer to precipitate while the solvent and water are in the liquid state, i.e., before substantial vaporization is permitted. Dispersion is then introduced into the steam stripping zone containing hot water and the solvent is flashed off. However, such a system requires considerable amounts of steam for stripping the total volume of water, solvent and polymer which are introduced into the stripping zone.

I have now found that the way the dispersion is introduced to the steam stripping zone is very important. By passing the polymer slurry and water through a louvered contacting zone in accordance with my invention there is avoided the introduction of excessive amounts of water into the stripping zone so that there is achieved a substantial reduction in the amount of steam otherwise required.

Thus an object of this invention is to provide an improved method for separating polymer from solvent. Another object of this invention is to provide a method for preventing excessive amounts of water to be introduced into the stripping zone. A still further object of this invention is to provide means for the exclusion of excessive water from the stripping zone.

Other aspects, objects, and the several advantages of this invention will be apparent to those skilled in the art upon a study of the disclosure and the appended claims.

In accordance with this invention, I have found that a substantial amount of the water required for precipitation of the polymer can be removed in a manner so as to avoid introducing the same into the steam stripping zone by passing the polymer solvent and water in contact through a zone having provided therein a plurality of louvered vanes.

As indicated, the polymeric materials to which this invention is particularly applicable are polymers of 1-olefins. Polymers of 1-olefins containing 2 to 8 carbon atoms and having no branching nearer the double bond than the 4-position have been found in recent years to possess superior heat resistance and low temperature properties when produced at relatively low temperatures and pressures. It is preferable to carry out the polymerization in hydrocarbon solvent. This invention has particular use in recovering the polymer from the solvent.

Examples of preferred 1-olefins include ethylene, propylene, 1-butene, 1-pentene, 1-hexene, 1-octene, 4-methyl-1-pentene, 4-methyl-1-hexene, 5-methyl-1-heptene, 6-methyl-1-heptene, and the like. The solvents especially useful in polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are a solvent for the polymer at the temperature in the polymerization range are suitable. Any hydrocarbon which is relatively inert, nondeleterious and liquid under the operating conditions of the process can be utilized. Diluents that have been used successfully in the polymerization reaction and are operable in this invention include propane, isobutane, n-pentane, isopentane, isooctane, (2,2,4-trimethyl pentane), cyclohexane, and methylcyclohexane. Unsaturated aliphatic and cyclic hydrocarbons are, in general, not used in the polymerization reaction since they are likely to enter the polymerization reaction. However, any of these hydrocarbons are operable in the present invention.

In the preferred operation of this invention, 1 volume of the hot polymer solution having a concentration in the range of 1 to 8 percent polymer and more preferably in the range of 2 to 5 weight percent is dispersed in 1 to 5 volumes of cool water having a temperature wherein the resulting dispersion will have a temperature below the precipitation temperature of the polymer and wherein both the solvent and water will be maintained in substantially liquid phase. The resulting precipitated polymer along with the water and solvent are then passed downwardly through a louvered vaned column wherein the vanes tend to form a guide for the polymer as it descends through same and the excessive water and solvent are removed prior to introduction into the stripping zone. A slight vacuum is placed on the stripping zone and steam is introduced into same so as to flash the solvent out of the dispersion of water, solvent and polymer. The hot water is agitated so as to break up the "rope," the polymer descending through the vane zone, so as to allow for subsequent flashing of any solvent associated with same.

When operating with polyethylene and cyclohexane a stripper temperature of 170° F. at atmospheric pressure or 140° F. at 7 p.s.i.a. is satisfactory. It is within the skill of the art to determine the proper temperature for any given pressure and solvent. This temperature will hereinafter and in the claims be referred to as the vaporization temperature of the solvent.

I have found this invention to be especially useful in recovering polymers of ethylene prepared by the method of Hogan et al. and precipitated from solution. However, while this invention will be discussed in conjunction with one such commercial process, it is understood that this method is equally applicable to 1-olefin polymers other than polyethylene and to solvents other than cyclohexane with proper adjustment of the temperature, pressure, and the like.

This invention can best be described by reference to the drawings attached and forming a part of this specification.

Figure 1:
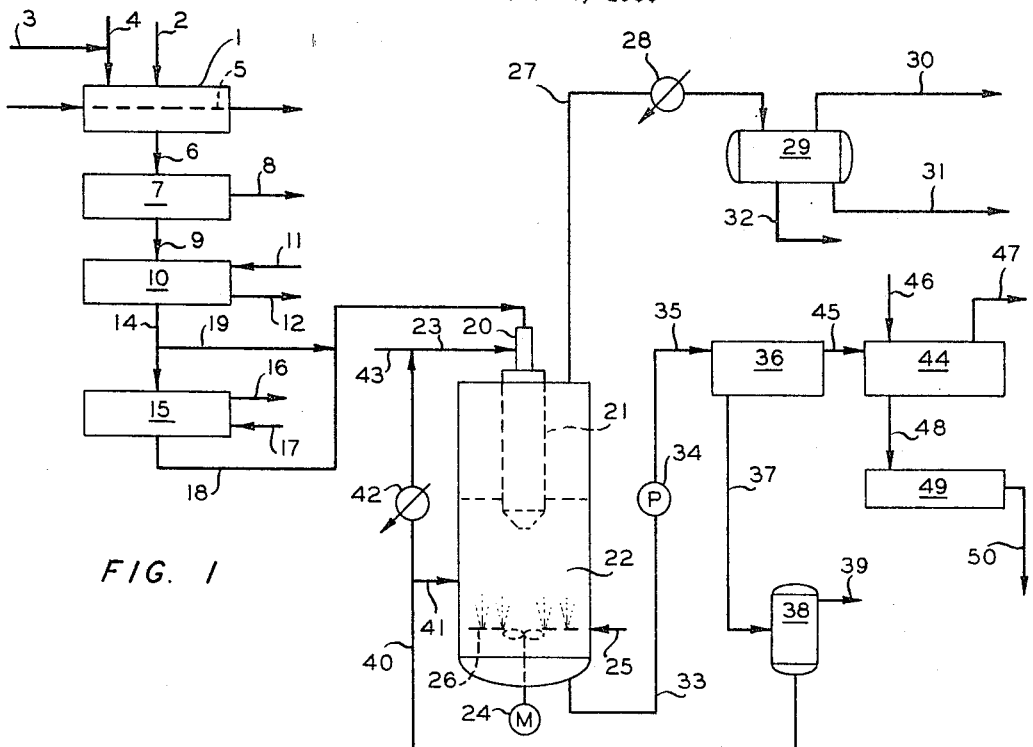
FIGURE 1 is a systemmatic flow diagram of the process for producing polymeric 1-olefins incorporated in this invention.
Figure 2:
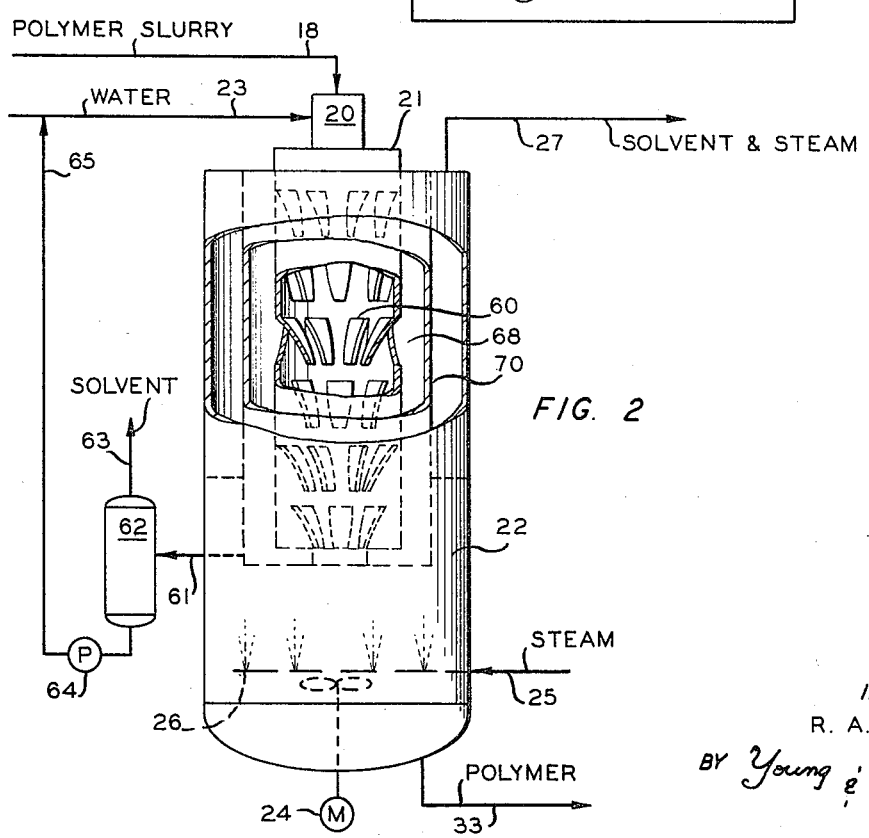
FIGURE 2 is a schematic cross-sectional view showing one flow section and showing a liquid guide vane system in accordance with the present invention.

Referring now to the drawings, a feed stream consisting essentially of ethylene is fed to the polymerization zone 1 by way of conduit 2. Catalyst and solvent (cyclohexane) are introduced into the polymerization zone by way of conduits 3 and 4, additional solvent as needed being added by way of conduit 4. The ingredients in each of these conduits 2, 3 and 4 are preferably at polymerization temperature (290° F.); however, one or more streams can be cooler with the remaining stream warmer so that the resulting dispersion is at the proper temperature. It should also be understood that the ethylene and solvent can be premixed as desired. The polymerization reaction is exothermic, therefore it is necessary to remove heat from the polymerization zone. One means for accomplishing this is by indirect heat exchange, for example, by passing cool water through heat exchanger 5. The polymerization zone effluent passes at about 290° F. from zone 1 by way of conduit 6 to monomer removal zone 7 wherein unreacted ethylene is vaporized and removed by way of conduit 8 to ethylene recycle. The mixture passes from monomer removal zone 7 by way of conduit 9 to catalyst removal zone 10 wherein the catalyst is separated from the solution. When catalyst is removed by filtration, the solution is generally diluted to about 3 percent polymer and solvent and the catalyst cake is subsequently washed with fresh solvent so that the effluent from zone 10 has a polymer concentration of 2 to 3 percent. Solvent is added to this zone 10 by way of conduit 11 and catalyst is removed by way of conduit 12. The hot solution passes from catalyst removal zone 10 by way of conduit 14 to concentration and adjustment zone 15. In general, the polyethylene concentration of effluent from zone 10 is relatively low, 2 to 3 percent, and in order to reduce the load on the stripping zone, to be discussed, a portion of the solvent is removed from the concentration and adjustment zone. On the other hand, if the concentration of polymer is too great, the system may become plugged. In general, it is preferable to adjust the concentration to about 3 to 6 percent. If solvent is removed it passes by way of conduit 16 to solvent recycle, and if solvent is required, it is supplied by way of conduit 17. In such cases it may be that the concentration is such that no adjustment is required, and the material then passes directly to conduit 18. In the example following, the concentration of the solution is adjusted to about 4.5 percent. In either case, the solution from zone 15 or 10 passes by way of conduit 18 to dispersion zone 20 and thence to the louvered vane zone 21 in stripping zone 22. About 4 volumes of water at 100° F. per volume of solution is introduced by way of conduit 23 to zone 20 and the solvent is dispersed therein so that the resulting dispersion is at a temperature within the range of 110° to 150° F. (preferably 110° to 130° F.). FIGURE 2 is an enlargement of this dispersion and separating zone.

Stripping zone 22 has hot water therein at a predetermined level. The hot water at 170° F. and atmospheric pressure is stirred by means of stirrer 24. While any means of supplying heat in the stripping zone can be used, steam is especially effective. Steam from conduit 25 is supplied to the stripping zone 22 by way of nozzles 26. The three-phase dispersion (solid polymer, water and solvent) enters zone 22 by means of louvered zone 21. The bulk of the solvent flashes off and is carried by steam overhead by way of conduit 27. The small amount of solvent remaining is substantially displaced by hot water in zone 22 and is also evaporated and carried overhead by way of conduit 27. This mixture of steam and solvent vapor passes to condenser 28 and phase separator 29. Non-condensed vapors are taken overhead from separator 29 by way of conduit 30, solvent is removed at 31 and sent to solvent recovery zone, not shown, and water is removed and recycled or sent to waste by way of conduit 32.

The polymer residence time in the stripping zone is in the range of 20 to 30 minutes. The polymer and water slurry is then removed from zone 22 by way of conduit 33 to pump 34 and via conduit 35 to separation zone 36. One convenient means of separating polymer and water is a skimmer tank; however any suitable means can be employed.

Water from separation zone 36 passes by way of conduit 37 to surge tank 38. Conduit 39 is provided to surge tank 38 to remove any excess water. The necessity for removing remaining water will be determined by the net loss or gain of water in stripping zone 22. The water in tank 38 will be still at about the temperature of the stripping zone 22, e.g., 170° F., for this example. This hot water is recycled to the system by way of conduit 40. A portion of this recycle water is returned directly to the stripping zone by way of conduit 41 and a portion cooled in heat exchanger 42. This cooled water along with any makeup water from conduit 43 is used as cooling water of conduit 23 to dispersion zone 20. The wet polymer from separator 36, still damp but having the solvent essentially replaced by water, is passed to drying zone 44 by way of conduit 45. Heating medium is intrdouced into drying zone 44 by way of conduit 46. A forced draft drier using air at 250° F. is satisfactory for this purpose. Any moisture is removed from the drying zone 44 by way of conduit 47. The dry polymer passes by way of conduit 48 to polymer extruder 49 wherein the polymer is compacted and the polymer product is removed by way of conduit 50.

Referring now to FIGURE 2, which shows a more detailed view of the dispersion and stripping zones of this invention, a polymer slurry of the desired concentration of polymer in solvent is introduced into the top of dispersion zone 20 by way of conduit 18. Water in a ratio of about 4 to 1 is introduced by way of conduit 23 into the dispersion zone. The water, being at a sufficient temperature to reduce the overall dispersion to a temperature below that of the precipitation part of the polymer, causes the polymer as it descends through zone 20 toward stripping zone 22 to achieve a rope-like configuration. Generally, the dispersion zone and the internal section of the vaned column are at a pressure of about 50 to 75 p.s.i.a. The annulus 68 formed by the outer column 70 surrounding the cylindrical louvered vaned column 21 is at a slightly reduced pressure of about 49 to 74 p.s.i.a. so as to provide a pressure drop of about 1 to 2 p.s.i. across the perforations in the column 21 formed by the vanes 60. This assures the liquid, water and/or solvent, will be removed into the annulus 68 between the two columns yet avoids the flow of polymer through the perforations rather than out the lower open end of column 21. By maintaining the stripper 22 at a pressure of 10 to 15 p.s.i.a. movement of the polymer rope through the column 21 is effected by the high pressure drop between the interior of the column and the stripper vessel. A plurality of louvered vanes 60 are provided through the zone 21 and serve to guide the precipitated polymer into the stripping zone 22 while at the same time allowing for the removal by means of conduit 61 of the precipitating water which is flowed over the louvered vanes. Water removed from this dispersion zone is passed through surge vessel 62 and comprises a mixture of solvent accumulated in the annular area 68 between the inner and outer columns within the stripper and water. Solvent is removed therefrom by means of conduit 63 and the remaining water is recycled by means of pump 64 and conduit 65 to serve as makeup for contacting water in conduit 23. The precipitated polymer after leaving the dispersion zone 20 is agitated by means of agitator 24 and simultaneously stripped by means of steam introduced through conduit 25. The insoluble polymer is removed as a dispersion in water by means of conduit 33 for additional treatment.

In the above description and the drawings, valves and the like are omitted. It is within the skill of the art to supply these. In the description certain modifications have been indicated; however, those skilled in the art will recognize that many such modifications can be made and still obtain the advantages of this invention. Important features are that the solvent be kept in substantially liquid phase during precipitation of the polymer and that the slurry be passed through a vane chamber which allows for removal of a substantial portion of the water used for precipitation of the polymer prior to its reaching the stripping zone.

If desired, a differential controller can be utilized to control the pressure drop across the perforations formed by the vanes. In this manner flow of liquid from the annular area through conduit 61 could be regulated responsive to the differential pressure. This in turn would avoid the possibility of the polymers passing through the perforations into the annular zone 68.

While the instant invention has been described in connection with the stripping zone in a vertical position, it will be apparent to those skilled in the art that operation of the concept of this invention is not dependent upon the repose of the stripping column. Likewise, while it is preferred that the vanes which serve as a guide for the rope of polymer through the elongated cylinder be inclined inwardly and downwardly, it is apparent that the vanes could be positioned externally of the cylinder and the walls of the cylinder serve as the guide for the rope of polymer.

When an olefin is polymerized in a hydrocarbon such as pentane at a temperature where the polymer as a solid is formed, a small amount of polymer is formed which remains soluble in the solvent, and when the polymer is separated from the solvent, this soluble material is carried out with the solvent. Also, polymer is frequently recovered by precipitating polymer in solvent, and here again a small amount of polymer remains soluble. In both of these latter cases, the soluble polymer can be recovered by the method of this invention. In all of these methods, a small amount of polymer is frequently entrained in the solvent and is carried overhead to the solvent recovery system. Such polymer is advantageously recovered by the method herein described.

The following example will further illustrate this invention.

*Example*

Ethylene was polymerized in cyclohexane according to the method of Hogan et al. with polymerization being carried out with the chromium oxide-silica-alumina catalyst containing approximately 2.5 weight percent chromium. The reactor effluent was subsequently diluted with additional cyclohexane to adjust the polyethylene concentration to 2.8 weight percent. This solution at a temperature of 240° F. was injected into a mix zone such as 20 at the rate of 1000 pounds per hour. Simultaneously, water at 85–100° F. entered into the mix zone by way of a conduit such as 23 at 4000 pounds per hour. The resulting dispersion temperature was 125° F., and this dispersion was allowed to descend through zone 20 into a coagulation or stripping tank 22 having 125 gallons of water at 170° F. and atmospheric pressure. This coagulation tank had a diameter of 4 feet and was provided with a stirrer. The residence time in the coagulation tank was 20 minutes, and the run was continued for eight hours. A slurry of polymer particles and water was removed from the stirpping tank and passed to additional processing steps. In the course of the operation, approximately 25–75 percent of the water introduced by way of conduit 23 into zone 20 was removed from an area adjacent the external edges of the louvered vanes. In this manner only about 25 percent of the water initially required for forming the precipitated polymer entered into the stripping zone 22 for ultimate stripping of the solvent therefrom.

Reasonable modifications of this invention can be made or followed in the light of the foregoing disclosure and discussion without departing from the spirit or the scope thereof.

I claim:
1. An apparatus for the separation of a slurry of finely divided polyolefin particles dispersed in a liquid hydrocarbon and water admixture which comprises, in combination, a vertically disposed and closed vessel; a first elongated cylinder opened at one end disposed in the top of said closed vessel; means communicating at the upper end of said first elongated cylinder to introduce water and polymer slurry thereto; a second elongated cylinder disposed in said closed vessel in closed communication with said first elongated cylinder at its lower end and spaced apart therefrom so as to form a closed annulus between said first and second cylinders, said first cylinder being in open communication with said vessel at its open end and containing a plurality of circumferentially spaced louvered vanes therein; means in an upper portion of said vessel for withdrawing vaporized hydrocarbon; means in an in- termediate portion of said vessel and openly communicating with said second elongated cylinder so as to remove withdrawing liquid accumulated in said annulus between said first and second cylinders; conduit means communicating with vessel to remove polymer particles and water therefrom; means in a lower portion of said vessel to introduce a stripping medium thereto; and means for agitating the slurry in the lower section of said vessel.

2. The apparatus of claim 1 wherein said plurality of vanes are circumferentially positioned around and throughout said first elongated cylinder so as to provide a confined area through which the polymer particles are guided while at the same time permitting a substantial amount of the liquid associated with said polymer particles to pass through to said annulus so as to be subsequently removed therefrom.

No references cited.

MORRIS O. WOLK, *Primary Examiner.*

JAMES H. TAYMAN, JR., *Assistant Examiner.*